(12) United States Patent
Boivin et al.

(10) Patent No.: US 6,234,263 B1
(45) Date of Patent: May 22, 2001

(54) RECREATIONAL VEHICLE

(75) Inventors: Alain Boivin, St-Henri de Lévis; Denis Boivin, La Pocatiére, both of (CA)

(73) Assignee: A & D Boivin Design, St-Henri (CA)

( * ) Notice: Subject to any disclaimer, the term of this patent is extended or adjusted under 35 U.S.C. 154(b) by 0 days.

(21) Appl. No.: 09/235,392

(22) Filed: Jan. 22, 1999

(51) Int. Cl.⁷ .................................................. B62M 27/02
(52) U.S. Cl. ........................ 180/184; 180/190; 180/9.25
(58) Field of Search ................................. 180/182, 184, 180/185, 190, 192, 400, 9.25, 219; 280/270, 16; D12/7; 74/554, 551.1

(56) References Cited

U.S. PATENT DOCUMENTS

| | | | |
|---|---|---|---|
| 4,337,958 | * 7/1982 | Witt et al. | ............................... 280/16 |
| 4,613,006 | 9/1986 | Moss et al. . | |
| 4,826,184 | * 5/1989 | Kuehmichel et al. | .............. 280/21.1 |
| 5,054,798 | * 10/1991 | Zulawski | ................. 280/16 |
| 5,064,208 | 11/1991 | Bibollet . | |
| 5,251,718 | 10/1993 | Inagawa et al. . | |
| 5,474,146 | 12/1995 | Yoshioka et al. . | |
| 5,518,080 | * 5/1996 | Pertile | ................................. 180/190 |
| 5,568,840 | 10/1996 | Nagata et al. . | |
| 5,957,230 | 9/1999 | Harano et al. . | |
| 5,996,717 | * 12/1999 | Hisadomi | ............................. 180/182 |

FOREIGN PATENT DOCUMENTS 3-7674 * 1/1991 (JP) .

* cited by examiner

*Primary Examiner*—Brian L. Johnson
*Assistant Examiner*—Avraham H. Lerner
(74) *Attorney, Agent, or Firm*—Goudreau Gage DuBuc

(57) ABSTRACT

A single seater snowmobile type recreational vehicle and a steering assembly for such as vehicle is described herein. The recreational vehicle includes a longitudinal frame, a suspension mounted to a rear portion of the frame, an endless track rotatably mounted to the suspension, an engine mounted to the frame and associated to the endless track to selectively rotate the endless track about the suspension thereby allowing displacement of the vehicle. The recreational vehicle also includes a steering assembly provided with a handlebar portion mounted to the frame and pivoting about a first pivot axis, a fork portion mounted to the frame and pivoting about a second pivot axis, a direction bar having a proximate end linked to the handlebar portion and a distal end linked to the fork portion, the direction bar being offset from the first and second pivot axis. A rotation of the handlebar portion thereby causes a rotation of the fork portion. The direction bar therefore allows the first and second pivot axis to be longitudinally spaced apart. The fork portion has a distal end configured and sized to receive a single ski.

16 Claims, 8 Drawing Sheets

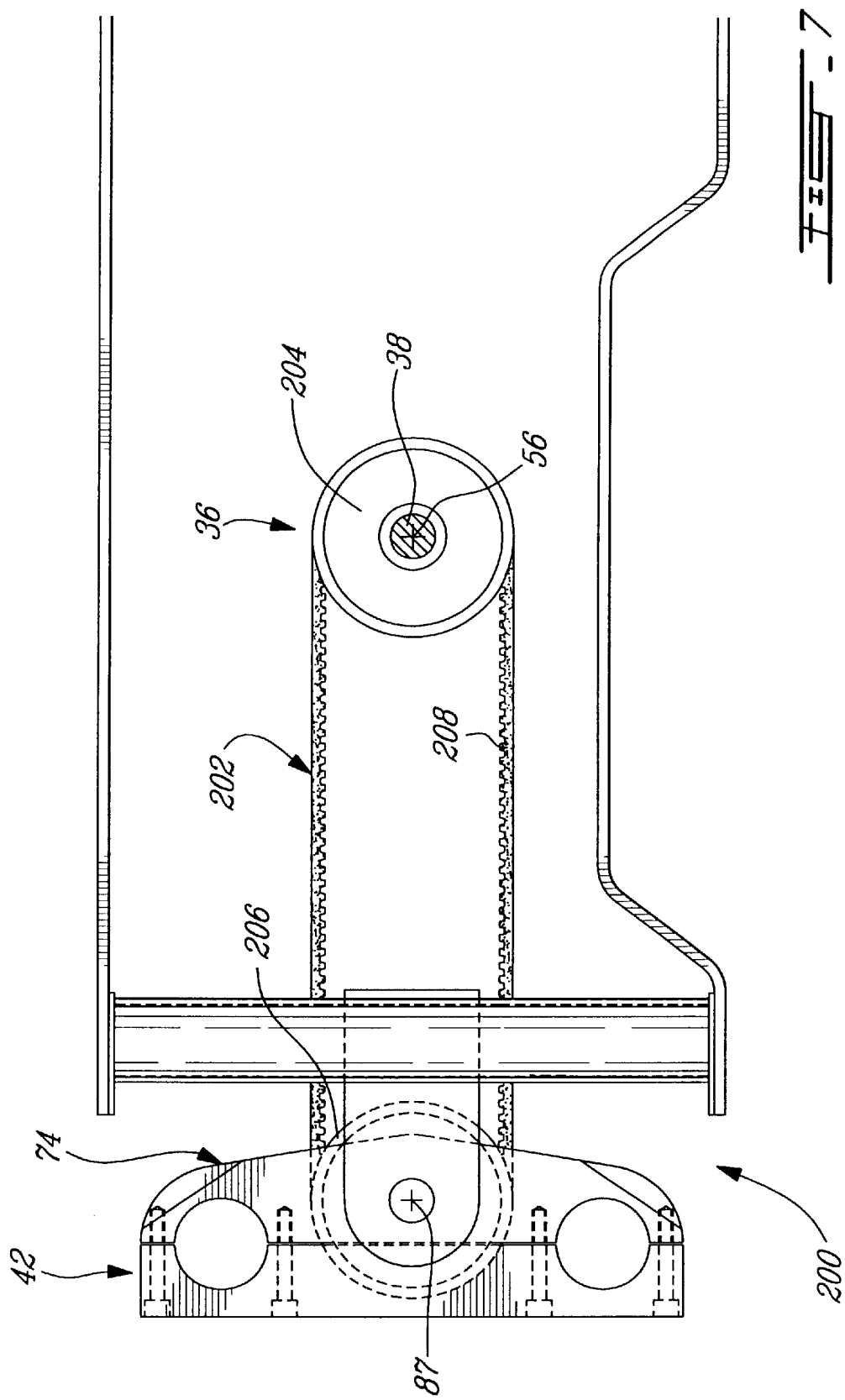

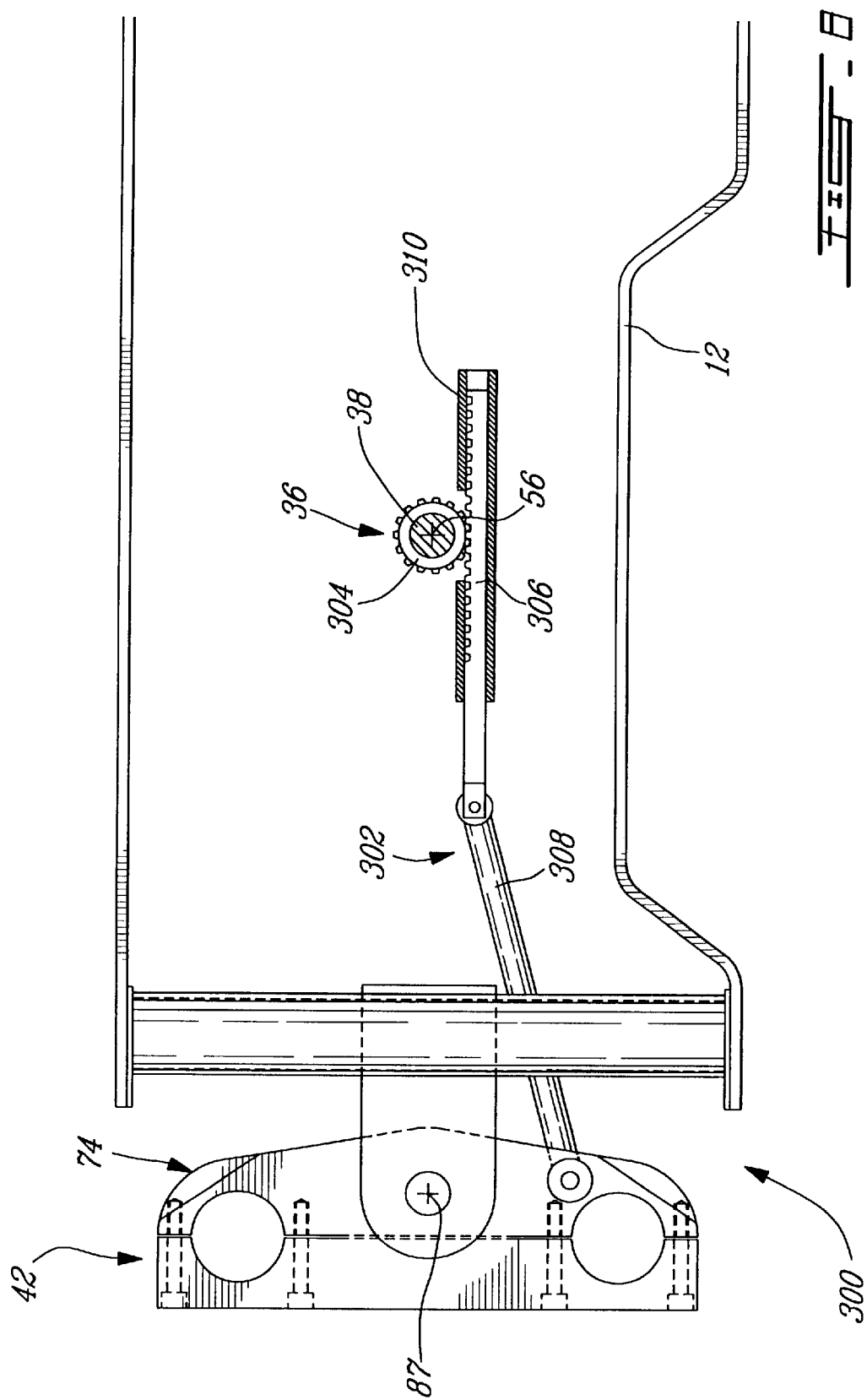

RECREATIONAL VEHICLE

FIELD OF THE INVENTION

The present invention relates to recreational vehicles. More specifically, the present invention is concerned with a single seater snowmobile type recreational vehicle. The present invention is also concerned with a steering assembly for such a recreational vehicle.

BACKGROUND OF THE INVENTION

Snowmobiles are well known in the art. They usually have a relatively long seat that allow the snowmobiles to be ridden by two people: a driver and a passenger. This, combined with the fact that snowmobiles are relatively wide and provided with a heavy gasoline powered engine, make the conventional snowmobile a relatively bulky recreational vehicle.

To overcome this bulkiness of the conventional snowmobile, many single seater snowmobile type recreational vehicles have been designed.

U.S. Pat. No. 5,474,146 issued to Yoshioka et al. on Dec. 12, 1995 and entitled "Snow Vehicle" describes such a single seater recreational vehicle. Yoshioka's snow vehicle has a motorcycle upper structure where a steered front ski replaces the conventional front wheel and an engine-driven endless belt track assembly replaces the rear wheel. While the snow vehicle described in this document arguably offers better handling over conventional snowmobiles since it is lighter and narrower, it also has a major drawback: instability. Indeed, since the weight of the driver is applied to the vehicle between the front ski and the endless track, i.e. close to the fork, and since the vehicle's seat is far from the ground, is it argued that Yoshioka's snow vehicle is inherently instable, the center of gravity being far from the ground and towards the front of the vehicle. This instability is increased by the fact that the endless track contacts the ground on a relatively short portion of the entire length of the vehicle.

The following United States Patents also describe similar single seater snowmobile type recreational vehicles having similar drawbacks:

| Number | Inventor | Issue Date |
|---|---|---|
| 4,613,006 | Moss et al. | September 23, 1986 |
| 5,064,208 | Bibollet | November 12, 1991 |
| Des. 333,110 | Mogi et al. | February 9, 1993 |

Indeed, the recreational vehicles shown in these documents all share the common motorcycle type steering assembly that positions the driver relatively in the front portion of the vehicle, which leads to instability, as discussed hereinabove.

U.S. Pat. No. 5,568,840 issued on Oct. 29, 1996 to Nagata et aL. describes a snowmobile where the driver is standing on a step floor. Instability is also a major drawback of Nagata's snowmobile since the center of gravity of the snowmobile, while in use, is far from the ground.

OBJECTS OF THE INVENTION

An object of the present invention is therefore to provide an improved snowmobile type recreational vehicle.

Another object of the present invention is to provide an improved steering assembly for snowmobile type recreational vehicles.

SUMMARY OF THE INVENTION

More specifically, in accordance with the present invention, there is provided a recreational vehicle comprising:
- a longitudinal frame;
- a suspension mounted to the frame;
- an endless track rotatably mounted to the suspension;
- an engine mounted to the frame and associated to the endless track to selectively rotate the endless track about the suspension;
- a steering assembly including:
    - a handlebar portion so mounted to the frame as to pivot about a first pivot axis;
    - a fork portion so mounted to the frame as to pivot about a second pivot axis; the fork portion having a distal end configured and sized to receive a ski; and
    - means for pivoting the fork portion about the second pivot axis when the handlebar portion is pivoted about the first pivot axis; the pivoting means being mounted to both the handlebar portion and to the fork portion;

whereby the pivoting means allow the first and second pivot axis to be longitudinally spaced apart.

According to another aspect of the present invention, there is provided a steering assembly for recreational vehicles including a longitudinal frame; the steering assembly comprising:
- a handlebar portion so mounted to the frame as to pivot about a first pivot axis;
- a fork portion so mounted to the frame as to pivot about a second pivot axis; the fork portion having a distal end configured and sized to receive a ski; and
- means for pivoting the fork portion about the second pivot axis when the handlebar portion is pivoted about the first pivot axis; the pivoting means being mounted to both the handlebar portion and to the fork portion;

whereby the pivoting means allow the first and second pivot axis to be longitudinally spaced apart.

Other objects, advantages and features of the present invention will become more apparent upon reading of the following non restrictive description of preferred embodiments thereof, given by way of example only with reference to the accompanying drawings.

BRIEF DESCRIPTION OF THE DRAWINGS

In the appended drawings:

FIG. 7 is a sectional view similar to FIG. 6 illustrating a second embodiment of the steering assembly of the present invention; and FIG. 8 is a sectional view similar to FIG. 6 illustrating a third embodiment of the steering assembly of the present invention.

DESCRIPTION OF THE PREFERRED EMBODIMENT

Turning now to FIGS. 1—6 of the appended drawings, a single seater snowmobile type recreational vehicle 10 will be described.

Figure 3:
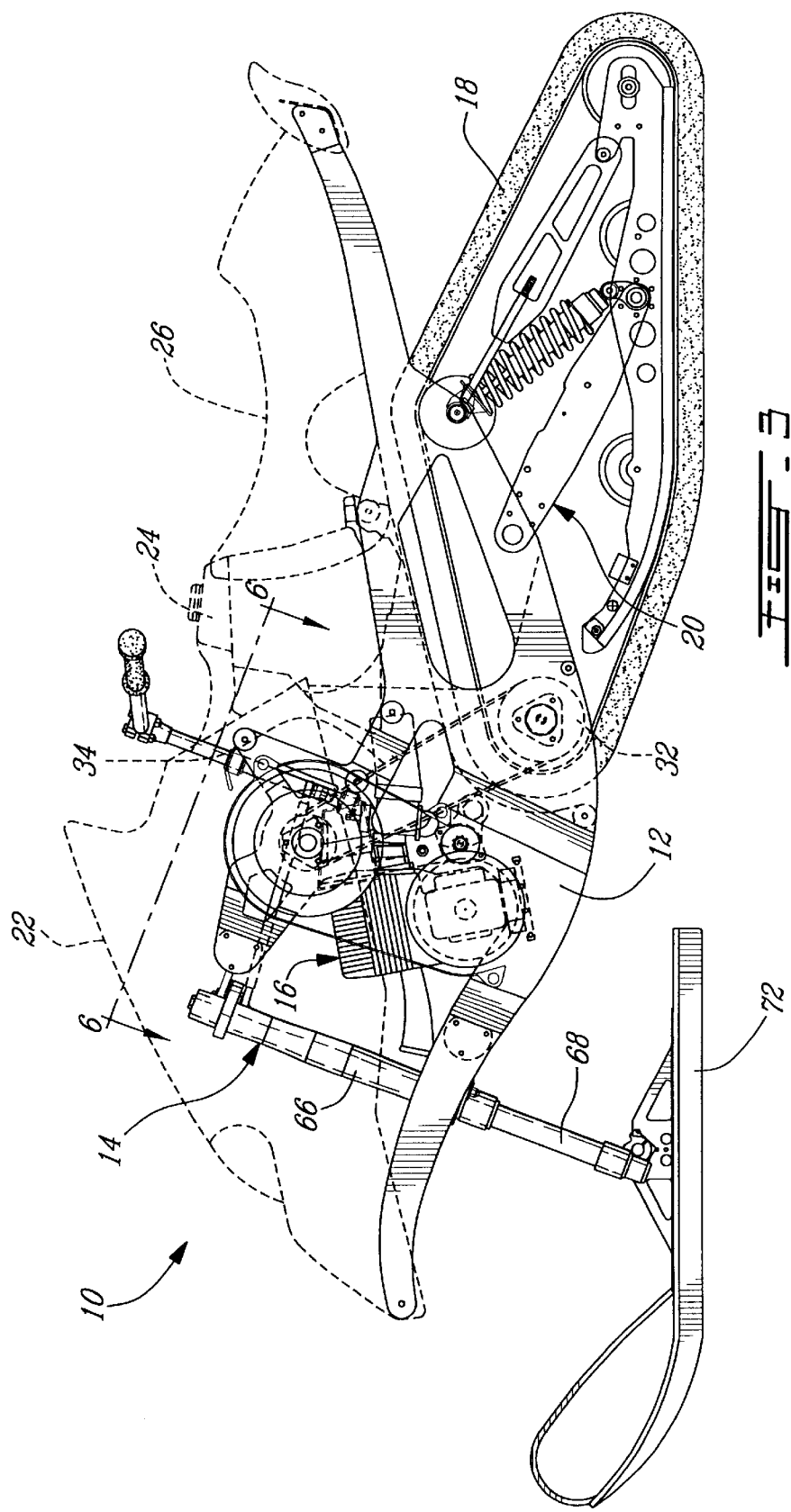
FIG. 3 is a side elevational view similar to FIG. 1 where the hood portion is shown in dashed lines.

As can be better seen in FIG. 3, the vehicle 10 includes a longitudinal frame 12, a steering assembly 14, a gasoline powered engine 16 and an endless track 18 rotatably mounted to a suspension assembly 20. As is apparent from FIG. 3, the steering assembly 14, the engine 16 and the suspension 20 are mounted to the frame 12.

Figure 1:
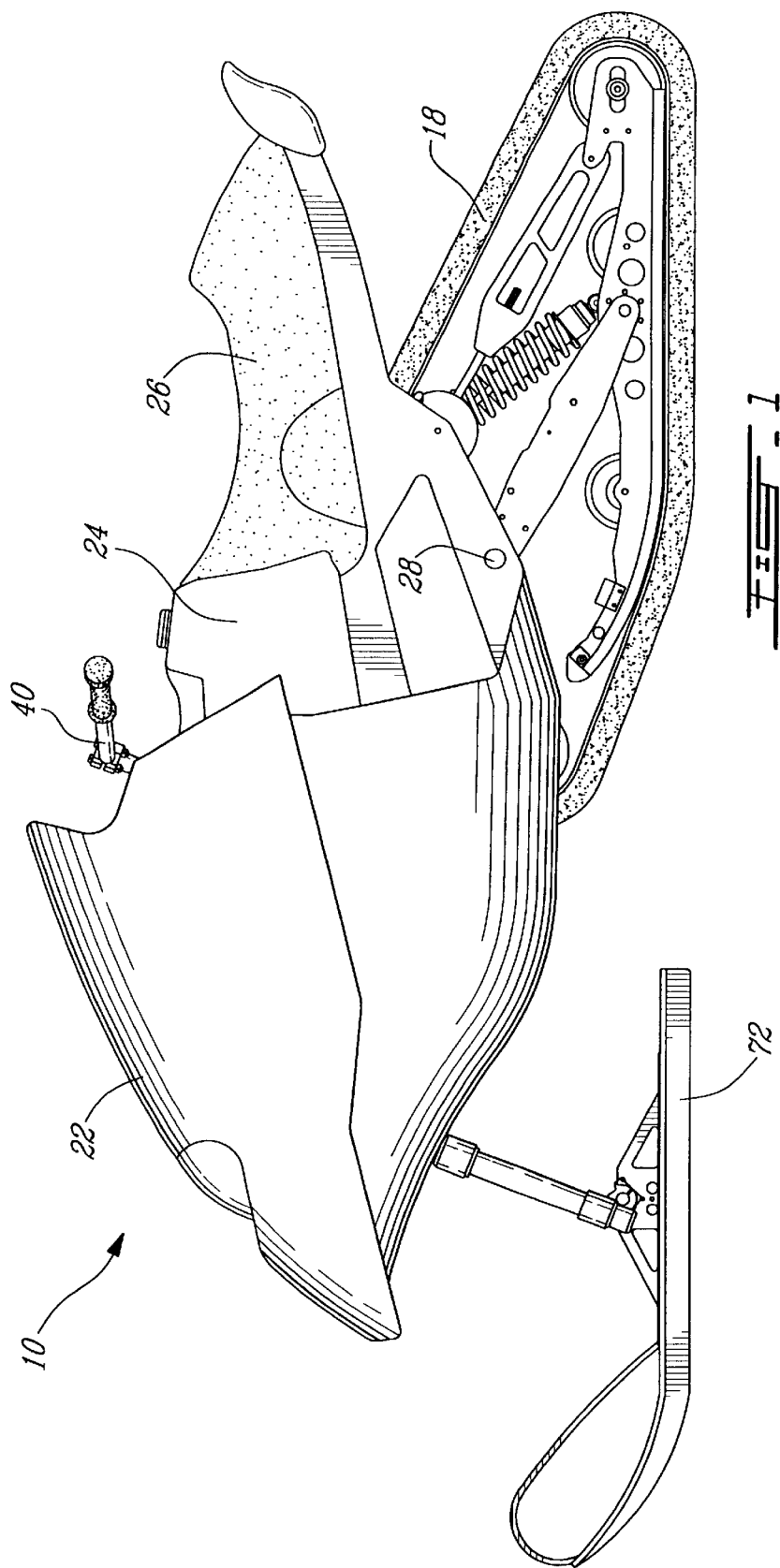
FIG. 1 is a side elevational view of a recreational vehicle according to an embodiment of the preferred invention.
Figure 2:
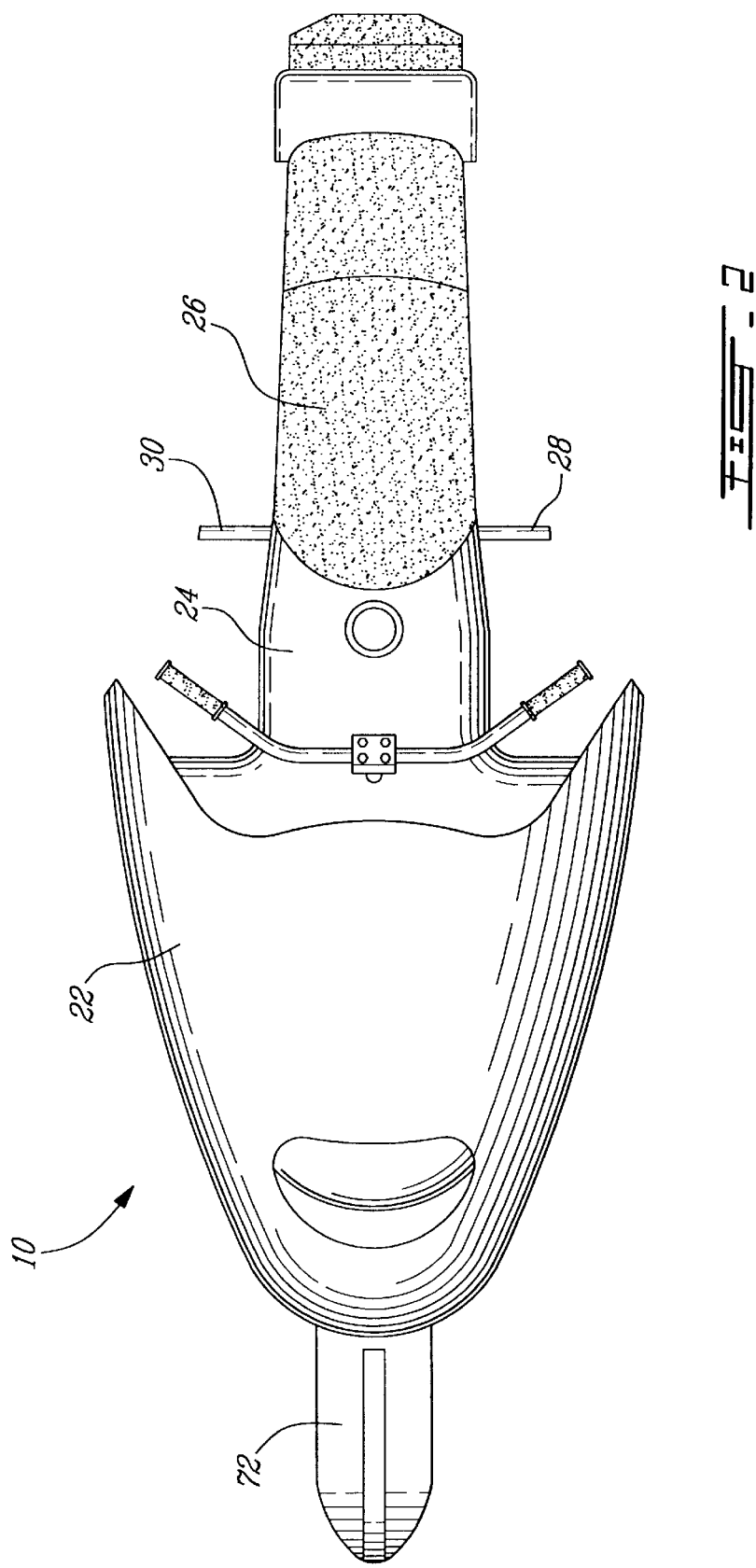
FIG. 2 is a top plan view of the recreational vehicle of FIG. 1.

The vehicle 10 also includes a streamlined hood 22, a gasoline tank 24, a seat 26 and two stirrups 28 and 30 (FIG. 2).

The gasoline powered engine 16 is similar to a snowmobile engine and is thus believed well known to those skilled in the art. The engine 16 is mechanically connected to a driven portion 32 of the suspension 20 to thereby power the rotation of the endless track 18 thereon. This mechanical connection is advantageously done via a cog belt 34. Of course, other similar mechanical power transmission means, such as, for example, V-belts or chains, could also be used. However, since the vehicle 10 is to be used on snow covered surfaces, the cog belt 34 is believed advantageous over other conventional mechanical power transmission means. Furthermore, cog belts are lighter that conventional snowmobile power transmission means and are more efficient.

It is to be noted that the engine 16 is mounted as low as possible onto the frame 12 to thereby get the lowest possible center of gravity of the vehicle, thereby increasing the stability thereof.

Since gasoline powered engines are believed well known in the art, engine 16 will not be further described herein.

The purpose of the suspension 20 is obviously to provide a smoother ride to the driver. Since it mounts the endless belt 18 to the frame, as do conventional snowmobile suspensions, it is believed that virtually any type of conventional snowmobile suspensions could be modified to the dimensions and requirements of the present invention. The suspension 20 illustrated in the appended drawings could therefore be replaced by other similar suspensions (not shown) without departing from the spirit and nature of the present invention. A description of the suspension 20, applied to a conventional snowmobile, can be found in laid open Canadian patent application No. 2,191,008, filed on Nov. 22, 1996 and entitled "Rear suspension system for a land vehicle".

It is to be noted that the endless belt 18 is relatively long and that a meaningful portion of the belt 18 engages the ground. Furthermore, since the suspension 20 is mounted inside the loop created by the endless belt 18, the radius of rotation of the belt 18 in the upper portion of the suspension 20 is increased, which increases the centrifugal forces created by the rotating belt 18, therefore increasing the stability of the vehicle 10.

It is also to be noted that the endless belt 18 is flat and narrow (about 12 inches (0.3 m) wide) and provided with long round rubber lugs (not shown) allowing lateral traction during leaned cornering.

Figure 4:
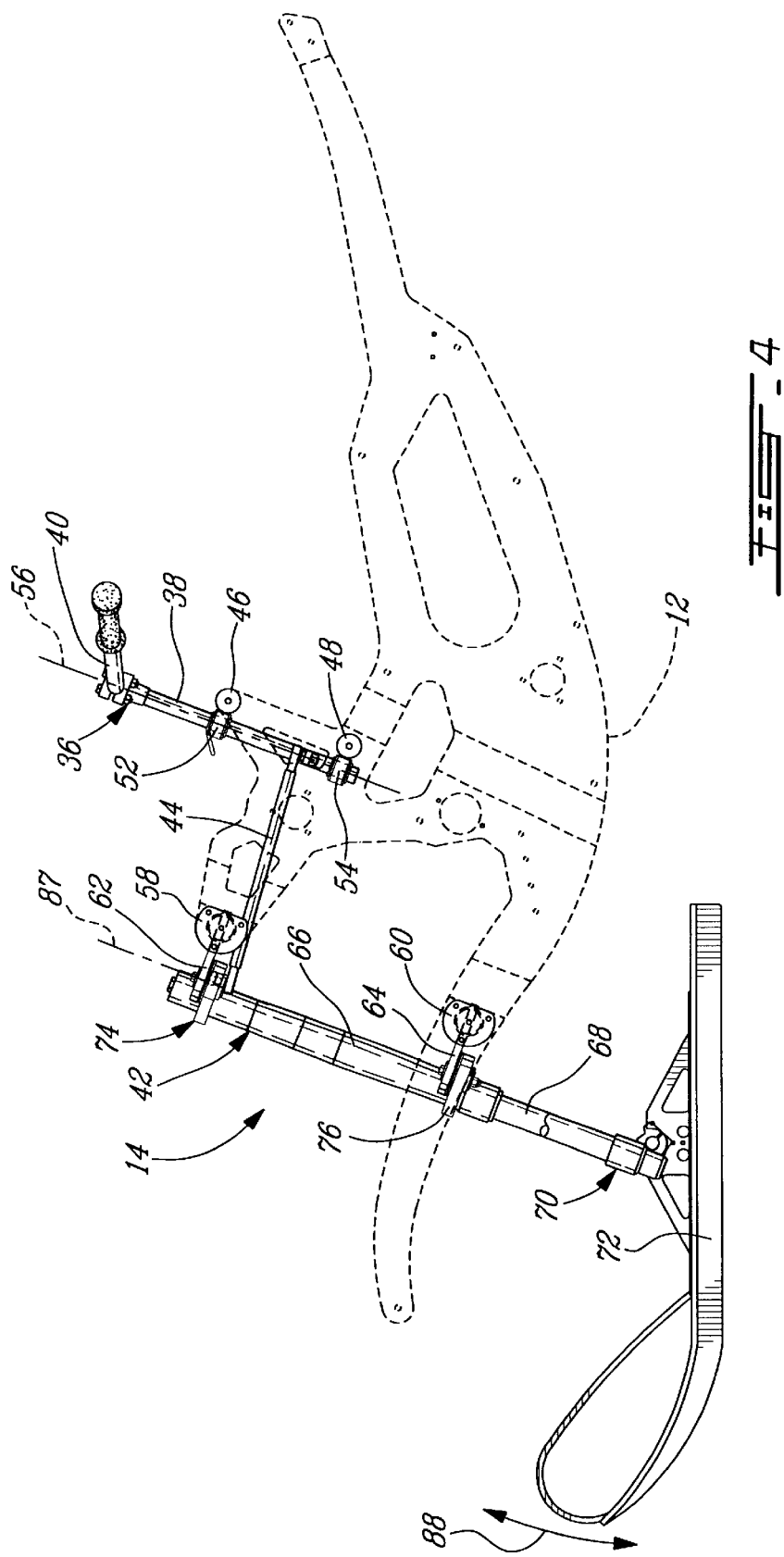
FIG. 4 is a side elevational view of a steering assembly of the recreational vehicle of FIG. 1.
Figure 5:
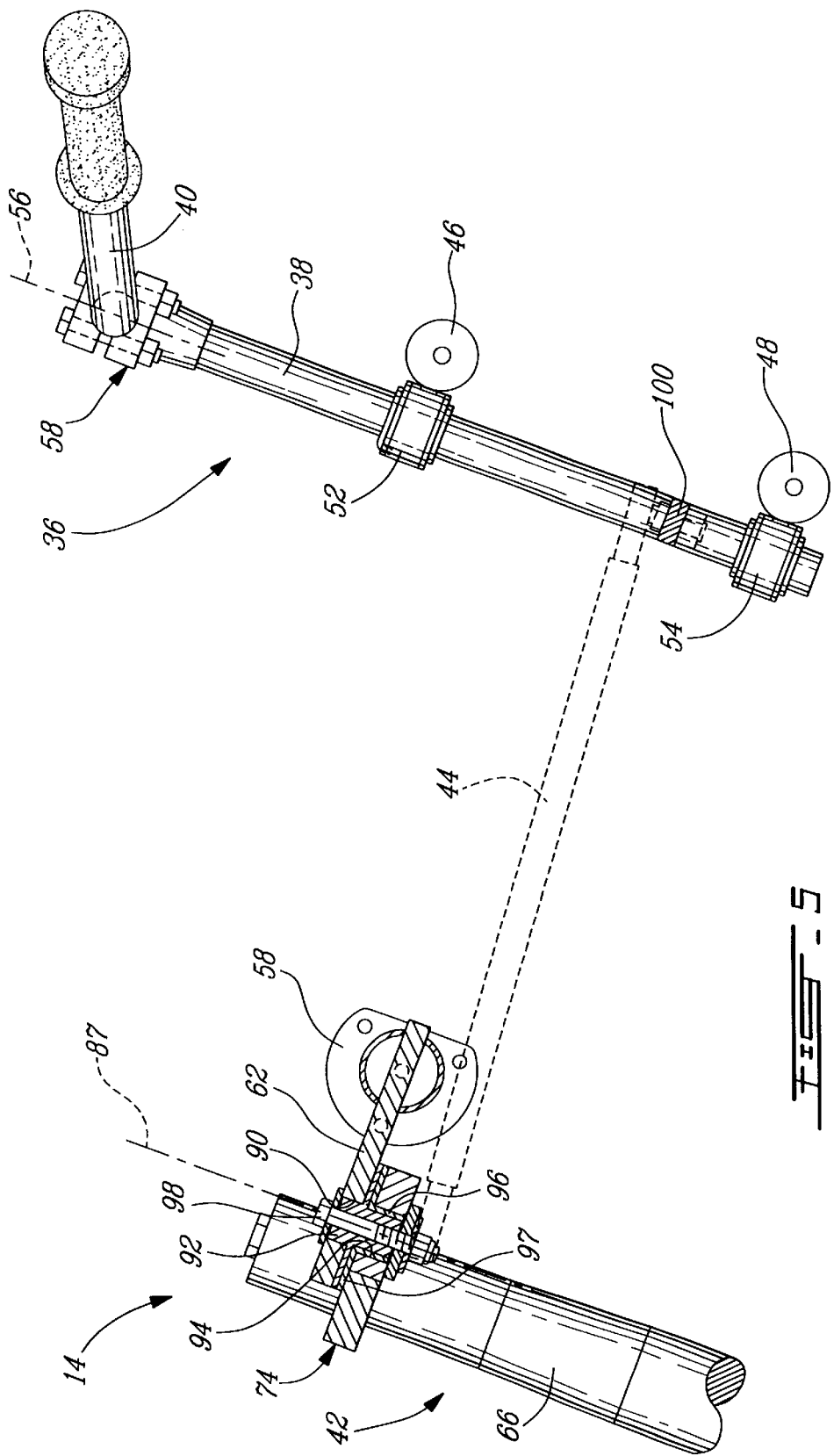
FIG. 5 is an enlarged view, partly in section, of a portion of the steering assembly of FIG. 4.
Figure 6:
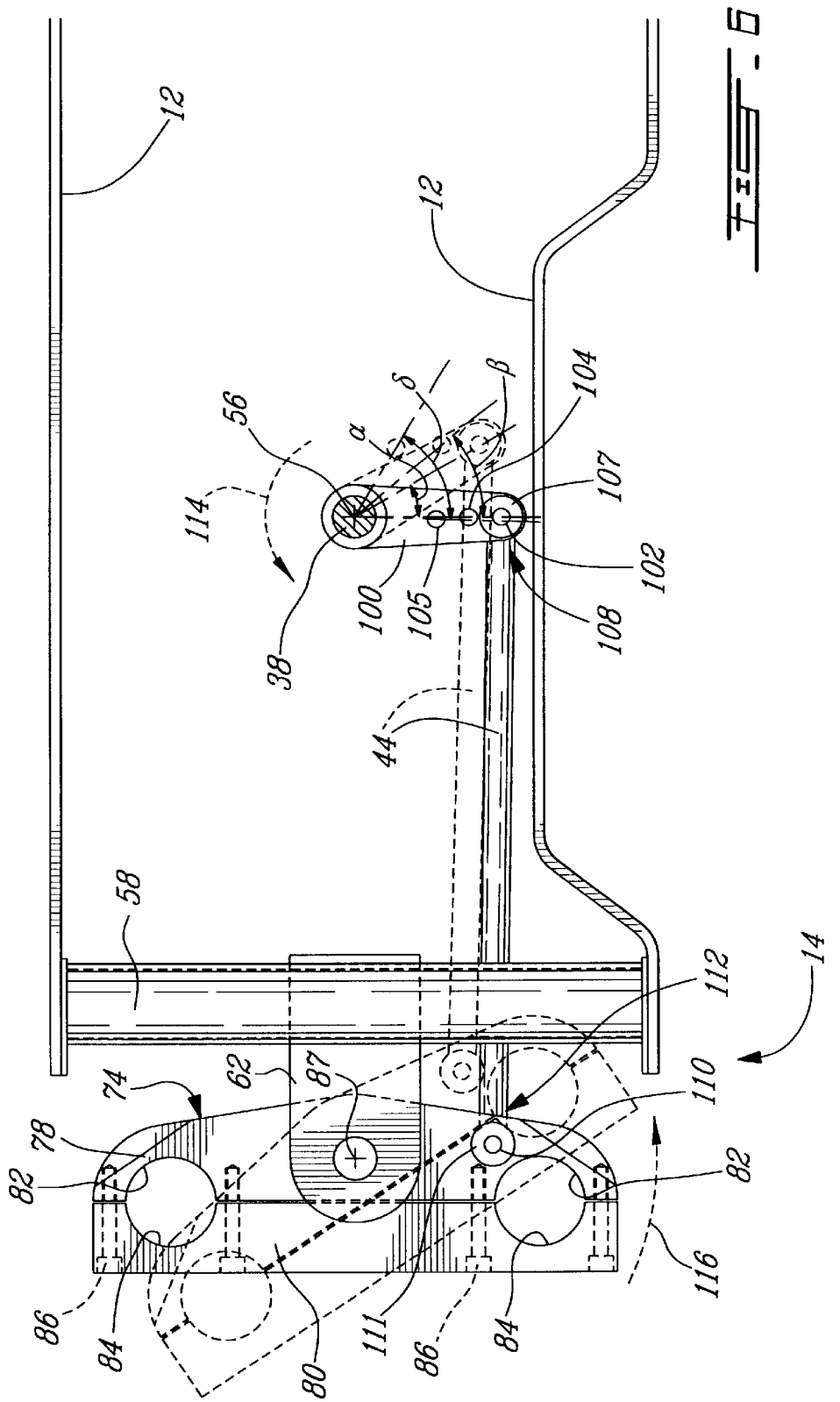
FIG. 6 is a sectional view taken along line 6—6 of FIG. 3.

Turning now more specifically to FIGS. 4 to 6, the steering assembly 14 will be described in greater details.

The steering assembly 14 includes a handlebar portion 36 having a stem 38 and handlebars 40, a fork portion 42 and a direction bar 44 interconnecting the handlebar portion 36 and the fork portion 42.

As will be apparent to one skilled in the art, the direction bar 44 allows the handlebar portion 36 to be positioned rearwardly from the fork 42, thereby positioning the driver (not shown) of the vehicle above the suspension 20. This position of the driver causes the center of gravity of the vehicle 10 to be near the center of the vehicle 10 since the weight of the driver is compensated by the weight of the engine 16. Furthermore, since the direction bar 44 is connected at a proximate end of the fork 42, it allows the engine to be positioned as close as possible to the ground, thereby lowering the center of gravity of the vehicle 10.

As can be better seen in FIGS. 4 and 5, the stem 38 of the handlebar portion 36 is pivotally mounted to the frame 12 via a pair of crossbars 46, 48 to which are respectively mounted plastic bushings 52, 54. These bushings allow the step 38 to pivot about a first pivot axis 56 without undue friction. The handlebars 40 are fixedly mounted to a proximate end 58 of the stem 38 via a conventional split fastening assembly. Of course, other types of fastening assemblies could be used to mount the handlebars to the pivotable stem.

The fork 42 is pivotally mounted to the frame 12 via a pair of crossbars 58, 60 to which are respectively fixedly mounted to pivot plates 62, 64. The fork 42 consists of two hydraulic cylinders 66 (only one shown) each provided with a reciprocately movable piston 68 (only one shown) having a distal end 70 to which a single ski 72 is pivotally mounted. The cylinders 66 are interconnected by two identical cylinder mounting plates 74, 76. As can be better seen from FIG. 6, each mounting plates 74, 76 is formed by two elements 78, 80 provided with respective complementary semi-circular apertures 82, 84 configured and sized to hold the cylinders 66 therein when fasteners 86 are used to interconnect the two elements 78, 80.

The cylinder mounting plate 74 is pivotally connected to the pivot plate 62 while the cylinder mounting plate 76 is pivotally mounted to the pivot plate 64. The fork 42 may therefore pivot about a second pivot axis 87, generally parallel to the first pivot axis 56.

As will be readily apparent to one skilled in the art, the purpose of the hydraulic cylinders 66 is to provide a front suspension to the vehicle 10.

The single ski 72 is so mounted to the distal end of the piston 70 as to pivot (see arrow 88) to follow the terrain.

Referring now back to FIG. 5 of the appended drawings, the pivotal connection between the cylinder mounting plate 74 and the pivot plate 62 will be described in greater details. Of course, for concision purposes, this description will not be repeated for the pivotal connection between the cylinder mounting plate 76 and the pivot plate 64.

As can be seen from this figure, the pivot plate 62 is provided with an aperture 90 sized to receive a first end of a generally t-shaped friction reducing element 92. The cylinder mounting plate 74 also has an aperture 94 provided with a friction reducing sleeve 96 having a flange 97 sized to receive a second end of the friction reducing element 92. A fastener 98 is used to removably secure these elements together. The friction reducing element 92 and the friction reducing sleeve 96 are advantageously made of a durable friction reducing material such as, for example, Nylatron® MOS2™.

Consideration will now be given to FIG. 6 to describe the interconnection of the handlebar portion 36 to the fork portion 42 that are linked via the direction bar 44.

The stem 38 is provided with an arm 100 fixedly mounted thereon. The arm 100 is provided with three adjustment apertures 102, 104 and 106 sized to receive a fastener 107, pivotally mounting a proximate end 108 of the bar 44 thereto. The proximate end 108 is shown linked to the handlebar 36 via the aperture 102 of the arm 100.

A distal end 112 of the direction bar 44 is linked to the fork portion 42. Indeed, the cylinder mounting plate 74 includes an aperture 110 sized to receive a fastener 111, pivotally mounting the distal end 112 of the bar 44 thereto.

As can be seen from this figure, the apertures 102, 104, 106 and 110 are so positioned that the bar 44 is offset from an imaginary line joining the two pivot axis 56 and 87.

As will be apparent to one skilled in the art, the direction bar 44 allows the first and second pivot axis to be longitudinally spaced apart.

The operation of the steering assembly 14 will now be described with respect to FIGS. 5 and 6 of the appended drawings. It is to be noted that the crossbars 46, 48 and the hydraulic cylinders 66 of the fork 42 are not shown in FIG. 6 for clarity purposes.

When the handlebars 40 are in the position illustrated in FIG. 5, the steering assembly 14 is in the position shown in full lines in FIG. 6. The ski 72 is therefore longitudinally aligned with the vehicle 10.

If the handlebars 40 are rotated left (see arrow 114) so that the arm 100 is positioned as illustrated in dashed lines, the direction bar 44 will be pulled therefore causing the counterclockwise rotation of the cylinder mounting plate 74 (see arrow 116). This rotation of the cylinder mounting plate 74 will cause the fork 44, hence the ski 72, to be rotated left.

Of course, if the handlebars 40 are rotated right (not shown) the bar 44 will be pushed therefore causing the clockwise rotation of the cylinder mounting plate 74 (not shown). A right rotation of the fork 44 and of the ski 72 will therefore result.

As can be also seen from FIG. 6, the apertures 104 and 106 of the arm 100 are adjusting apertures allowing the user to adjust the deflection of the handlebars 40 required to produce a known deflection of the ski 72 by modifying the distance between the first pivot axis 56 and the pivotal connection between the bar 44 and the arm 100. Indeed, the deflection a required to pivot the cylinder mounting plate 74, as illustrated in dashed lines when the proximate end 108 is connected to aperture 102, is increased to β if the proximate end 108 is connected to aperture 104, and to δ if the proximate end 108 is connected to aperture 106.

While it is not illustrated in the appended figures, similar adjustment apertures (not shown) could be provided in the cylinder mounting plate 74 to modify the distance between the second pivot axis 87 and the pivotal connection between the bar 44 and the cylinder mounting plate 74.

It is also to be noted that while the direction bar 44 is shown in the appended figures as being a non adjustable bar, it could advantageously be designed as a length adjustable direction bar to allow minute adjustments to be made to precisely adjust the angle of the handlebar to the angle of the fork portion.

Turning now to FIG. 7 of the appended drawings, which is a sectional view similar to FIG. 6, a steering assembly 200 according to a second embodiment of the present invention will be described.

The steering assembly 200 is very similar to the steering assembly 14 shown in FIG. 6. The only difference between these two steering assemblies concerns the link between the fork portion 42 and the handlebar portion 36. Indeed, the direction bar 44 of the steering assembly 14 has been replaced by a cog belt assembly 202 including a stem pulley 204, a fork pulley 206 and a cog belt 208. Since the pulleys 204 and 206 are respectively fixedly mounted to the stem 38 and to the cylinder mounting plate 74, rotation of the handlebar will cause a similar rotation of the fork assembly, as will easily be understood by one skilled in the art.

It is to be noted that the cog belt assembly 202 could be replaced by a chain assembly (not shown) where the cog belt 208 would be replaced by a chain and the pulleys would be replaced by dented wheels.

Turning now to FIG. 8 of the appended drawings, which is a sectional view similar to FIG. 6, a steering assembly 300 according to a third embodiment of the present invention will be described.

The steering assembly 300 is very similar to the steering assembly 14 shown in FIG. 6. The only difference between these two steering assemblies concerns the link between the fork portion 42 and the handlebar portion 36. Indeed, the direction bar 44 of the steering assembly 14 has been replaced by a cog rail/pinion assembly 302 comprising a pinion 304, a cog rail 306 and a direction bar 308.

The pinion 304 is fixedly mounted to the stem 38 to thereby pivot about the first pivot axis 56.

The cog rail 306 is slidably mounted to the frame 12 via a bracket 310 secured to the crossbar 48 (not shown in this figure).

The direction bar 308 has a proximate end pivotally mounted to the end of the cog rail 306 and a distal end pivotally mounted to the cylinder mounting plate 74.

As will be easily understood by one skilled in the art, the pivoting action of the stem 38 will cause the longitudinal displacement of the cog rail 306, which, in turn, will force the direction bar 308 to pull or to push onto the cylinder mounting plate 74 therefore pivoting the fork portion 42 about the second pivot axis 87.

It is to be noted that the amount of pivoting of the stem 38 required to cause a predetermined pivoting of the fork portion 42 is determined by the diameter of the pinion 304.

It is to be noted that while the recreational vehicle 10 is shown and described as being a single seater, it would within the reach of one skilled in the art to design a two seater recreational vehicle similar to the recreational vehicle 10.

Although the present invention has been described hereinabove by way of preferred embodiments thereof, it can be modified, without departing from the spirit and nature of the subject invention as defined in the appended claims.

What is claimed is:

1. A recreational vehicle comprising:
   a longitudinal frame;
   a suspension mounted to said frame;
   an endless track rotatably mounted to said suspension;
   an engine mounted to said frame and associated with said endless track to selectively rotate said endless track about said suspension;
   a steering assembly including:
      a handlebar portion so mounted to said frame as to pivot about a first pivot axis;
      a fork portion so mounted to said frame as to pivot about a second pivot axis; said fork portion having a distal end configured and sized to receive a ski; and
      means for pivoting said fork portion about said second pivot axis when said handlebar portion is pivoted about said first pivot axis; said pivoting means include a direction bar having a proximate end linked to said handlebar portion and a distal end linked to said fork portion; said direction bar being offset from said first and second pivot axis so that a pivoting action of said handlebar portion causes a pivoting action of said fork portion;

whereby said pivoting means allow said first and second pivot axis to be longitudinally spaced apart.

2. A recreational vehicle as recited in claim 1, wherein said handlebar portion has an arm generally perpendicular to said first pivot axis; and wherein said proximate end of said direction bar is pivotally connected to said arm.

3. A recreational vehicle as recited in claim 2, wherein the distance between the pivotal connection of said proximate end of said direction bar to said arm and said first pivot axis is adjustable.

4. A recreational vehicle as recited in claim 1, wherein said fork portion includes a pair of hydraulic cylinders and first and second cylinder mounting plates maintaining a parallel relationship between said hydraulic cylinders; said first and second cylinder mounting plate s being pivotally mounted to said longitudinal frame.

5. A recreational vehicle as recited in claim 4, wherein said distal end of said direction bar is pivotally connected to said first cylinder mounting plate.

6. A recreational vehicle as recited in claim 5, wherein the distance between the pivotal connection of said distal end of said direction bar to said first cylinder mounting plate and said second pivot axis is adjustable.

7. A recreational vehicle as recited in claim 1, wherein said direction bar is connected to a proximate end of said fork portion.

8. A recreational vehicle as recited in claim 1, wherein said handlebar portion includes handlebars.

9. A steering assembly for recreational vehicles including a longitudinal frame; said steering assembly comprising:

a handlebar portion mountable to said frame as to pivot about a first pivot axis;

a fork portion mountable to said frame as to pivot about a second pivot axis; said fork portion having a distal end configured and sized to receive a ski; and means for pivoting said fork portion about said second pivot axis when said handlebar portion is pivoted about said first pivot axis; said Pivoting means including a direction bar having a proximate end linked to said handlebar portion and a distal end linked to said fork portion; said direction bar being offset from said first and second pivot axis so that a pivoting action of said handlebar portion causes a pivoting action of said fork portion;

whereby said pivoting means allow said first and second pivot axis to be longitudinally spaced apart.

10. A steering assembly as recited in claim 9, wherein said handlebar portion has an arm generally perpendicular to said first pivot axis; and wherein said proximate end of said direction bar is pivotally connected to said arm.

11. A steering assembly as recited in claim 10, wherein the distance between the pivotal connection of said proximate end of said direction bar to said arm and said first pivot axis is adjustable.

12. A steering assembly as recited in claim 9, wherein said fork portion includes a pair of hydraulic cylinders and first and second cylinder mounting plates maintaining a parallel relationship between said hydraulic cylinders; said first and second cylinder mounting plates being pivotally mounted to said longitudinal frame.

13. A steering assembly as recited in claim 12, wherein said distal end of said direction bar is pivotally connected to said first cylinder mounting plate.

14. A steering assembly as recited in claim 13, wherein the distance between the pivotal connection of said distal end of said direction bar to said first cylinder mounting plate and said second pivot axis is adjustable.

15. A steering assembly as recited in claim 9, wherein said direction bar is connected to a proximate end of said fork portion.

16. A steering assembly as recited in claim 9, wherein said handlebar portion includes handlebars.

* * * * *